Nov. 2, 1943.　　　J. H. FRAKES ET AL　　　2,333,532
INSULATION TESTING EQUIPMENT
Filed Feb. 26, 1941
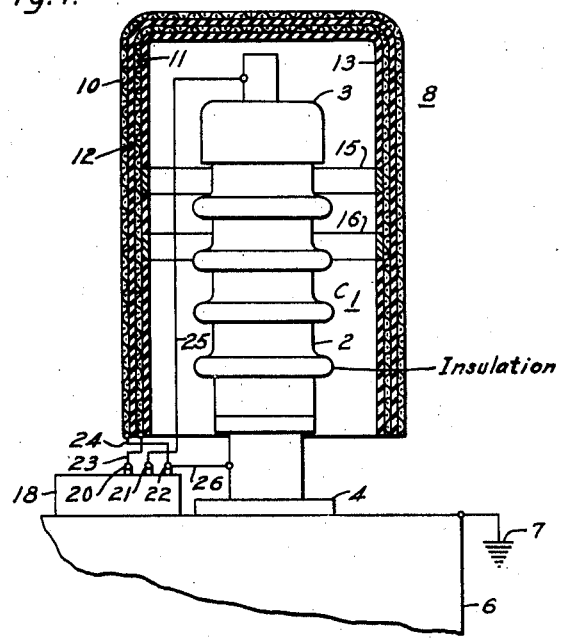
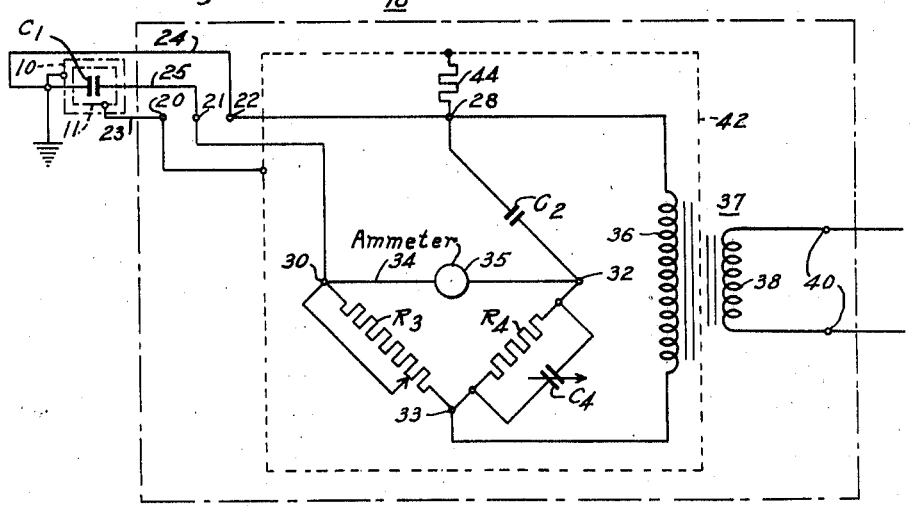
WITNESSES:
INVENTORS
James H. Frakes and
George C. Saltzman.
BY
ATTORNEY Patented Nov. 2, 1943

2,333,532

UNITED STATES PATENT OFFICE 2,333,532

INSULATION TESTING EQUIPMENT

James H. Frakes, Edgewood, and George C. Saltzman, Forest Hills, Pa., assignors to Westinghouse Electric & Manufacturing Company, East Pittsburgh, Pa., a corporation of Pennsylvania Application February 26, 1941, Serial No. 380,654

4 Claims. (Cl. 175—183)

The present invention relates to equipment for testing electrical insulation and it has particular relation to such equipment for determining the insulation qualities of high-tension insulating bushings, transformer coils and the like. The invention will be found to have especial utility when employed for testing specimens in the field where they are generally subject to the action of strong extraneous electrostatic fields.

In testing bushing insulators in the field, numerous problems have arisen because they are generally mounted on a grounded structure, and are subjected to external electrostatic fields from adjacent power lines. Present methods of making dielectric loss tests under these conditions require correction because of this latter factor. These corrections generally consist of taking the average of readings made with the testing voltage supplied in one direction and then with it reversed.

According to the present invention, however, such a reversal of the test voltage supply is unnecessary. An electrical shield is provided about the insulator itself to eliminate the effects of the extraneous electrostatic fields which may exist because of high-voltage overhead conductors and other such equipment in its vicinity. The shield of the present invention may be employed with either the null type of testing circuit or with the wattmeter type, and comprises a pair of metallic shields substantially enclosing the exposed part of the insulator to be tested. These shields are insulated from each other and are connected respectively to ground and to the guard circuit of the testing equipment.

It is accordingly an object of the present invention to provide testing equipment for dielectrics in which the specimen will be so shielded from any extraneous electrostatic field that the accuracy of the equipment will be substantially improved.

It is another object of the invention to provide dielectric testing equipment comprising a portable hood member which substantially encloses the specimen undergoing tests and is electrically associated with the remaining testing equipment in such a manner that the effects of extraneous electrical fields are substantially eliminated.

Other objects and advantages of the invention will appear from the following detailed description taken in conjunction with the accompanying drawing, in which:

Figure 1 is a side view, partly in section, of a high-voltage insulator with the equipment of the present invention associated therewith; and Fig. 2 is a schematic wiring diagram of the apparatus shown in Fig. 1.

Referring to Figure 1, a bushing designated generally as $C_1$ includes the usual ceramic casing 2, high-voltage terminal 3 and metallic mounting flange 4. This bushing is shown in its usual operating position upon a metallic tank 6 which may enclose an electric circuit-breaker, transformer, or like equipment. The tank 6 is shown connected to ground at 7.

A shielding hood 8 substantially envelops the exposed portions of the bushing $C_1$, and includes a pair of spaced metallic shields designated as 10 and 11, respectively. These shields may be of braided fine metallic wires or sheets of wire fabric, or of other preferably flexible material which is used in the art for shielding purposes. A layer of insulating material 12 is disposed between these two metallic shields, while another hood portion 13, also of insulating material, may be disposed within and secured to the inner shield 11. This portion 13 is made up of separate sections which are spaced from each other by horizontally disposed metallic ring members 15 and 16. These ring members are in electrically conducting relationship to the inner shield 11. It is preferred to form the insulating portions of the hood of cloth or other flexible material and secure them to the shield portions so as to form a unitary flexible hood which may be easily placed in position on an insulator despite space limitations thereabout. The grounded shield 10 may, of course, be covered with insulating material, if desired.

A portable insulation testing set designated generally as 18 and including terminals 20, 21 and 22 is associated with the apparatus previously described. Terminal 20 is electrically connected to the inner shield 11 by a conductor 23, while grounded conductor 24 connects the outer shield 10 to the terminal 22. The terminal 21 is connected by means of a conductor 25 to the high-voltage terminal 3 of the bushing, and the conductor 26 also connects the terminal 22 to the grounded portion of the bushing. The testing set is preferably disposed in close proximity to the hood 8 so that the major portion of these lead conductors will be disposed within it and thus shielded thereby.

In Fig. 2 is shown a wiring diagram of the testing equipment 18. The bushing $C_1$ which is to be tested and a standard condenser $C_2$ are respectively connected in adjacent arms of a bridge circuit between the grounded junction 28 and the junctions 30 and 32. Of the remaining two bridge arms, one contains a variable resistor R₃ and the other a fixed resistor R₄ shunted by a variable condenser C₄. Both of these latter arms are connected to bridge junction 33. A bridge balance conductor 34 is employed to connect an indicating instrument 35 between the junctions 30 and 32 of the bridge circuit. This instrument may be a micro-ammeter, for example.

A testing potential is applied across the junctions 28 and 33 of the bridge from a secondary winding 36 of a transformer 37. A primary winding 38 of this transformer is connected across an alternating voltage source 40 which may be the usual 115-volt supply which is so widely available. The transformer 37 is preferably such that its output voltage is in the order of several kilovolts, although a different test potential may be employed if desired.

The bridge above described is the so-called inverted Schering bridge, and is more fully described in United States Patent 2,130,865 issued on September 20, 1938, to Watts et al.

A guard circuit designated as 42 is adapted to enclose the bridge circuit and the leads in a manner which is well known in the art. The purpose of this guard is to eliminate the effect of external fields on the testing equipment and it is preferably connected through a resistor 44 to grounded portion of the bridge such as 28 in order to maintain it at a potential in excess of the ground voltage. It is within the scope of the invention to employ other of the various suitable guard structures which are well known in the art for protecting testing sets in this manner.

The outside terminals 20, 21 and 22 of the testing apparatus 18 are connected respectively to the guard circuit 42, bridge junction 30 and bridge junction 28. Thus the apparatus C₁ which is to be tested is connected in an arm of the bridge between the junctions 28 and 30 as previously indicated. The outer metallic shield 10 of the hood member 8 is consequently connected to ground and thus serves as a shield to prevent any loss between the outside electrostatic field and the specimen C₁. The inner shield 11 is connected to the guard circuit as set forth above and, since it is insulated from the grounded shield, it serves to prevent any loss between the terminal 3 of the specimen C₁ and the grounded guard member 10.

As mentioned before, the conducting rings 15 and 16 interrupt the continuity of the inner insulating layer 13 of the hood 8. Thus any leakage which might otherwise occur through it from the bushing terminal 3 to the various grounded members will be intercepted by these members and carried to the inner shield 11.

In employing the present invention for testing a high tension insulator, it is, of course, unnecessary to remove the insulator from its grounded position. The high-voltage terminal is first disconnected from the line and the hood 8 placed around the insulator and connected to the testing circuit in the manner described. With the transformer 37 properly energized, the bridge member is then balanced by adjusting the resistor R₃ and the condenser C₄ to obtain a null reading on the micro-ammeter 35.

When the bridge is thus balanced, as indicated by the micro-ammeter, the power factor of the bushing and the capacitance thereof may be readily computed in the manner described in the above-mentioned Patent No. 2,130,865. Thus, with the capacitance measured in microfarads and the resistance in ohms, the following formulae obtain.

$$\frac{C_4}{10} = \cot \theta = \omega R_4 C_4 \quad (1)$$

$$C_1 = C_2 \frac{R_4}{R_3} \quad (2)$$

For the values of power factor which are generally encountered in these tests, cot θ is, for all practical purposes, equal to cos θ which is the power factor expression. Thus for power factors up to 10%, the first equation may be relied upon as giving the proper value thereof, but in cases where it is greater than 10% it becomes necessary to refer to a trigonometric table or chart to find the cosine of the angle having the value of cotangent which is given thereby.

While the invention has been explained with reference to testing apparatus of the bridge type, it will be clear that it may also be applied to equipment for testing by other arrangements including the so-called wattmeter method. This latter method is well known in the art, and a description thereof will be found in United States Patent 1,945,263 to Doble. In applying the invention to this wattmeter method of testing, the outer shield is grounded in the manner previously described and the inner shield is connected to a portion of the ungrounded guard circuit which is generally employed therein.

Since various modifications may be made in the particular apparatus shown and described without departing from the spirit and scope of the invention, it is intended that the invention shall be limited only by the appended claims interpreted in view of the prior art.

We claim as our invention:

1. In combination with a grounded insulator having a high tension terminal, a test circuit connected to said insulator to energize it with a test voltage and measure the insulating properties thereof, a guard circuit for shielding at least a portion of said test circuit, a hood member including a pair of metallic shields disposed within one another with insulation therebetween and substantially enclosing said insulator, means connecting the outer of said shields to ground and the inner of said shields to said guard circuit, and a hood portion of insulating material disposed within said inner metallic shield to insulate it from said insulator, said insulating hood portion comprising a plurality of sections so separated from each other at a location between said high tension terminal and the grounded portion of said insulator that any leakage current from said high tension terminal to said insulation section adjacent thereto is intercepted by said inner metallic shield.

2. In combination with a grounded insulator having a high tension terminal, a test circuit connected to said insulator to energize it with a test voltage and measure the insulating properties thereof, a guard circuit for shielding a high potential member in said test circuit, a hood member including a pair of metallic shields disposed within one another with insulation therebetween and substantially enclosing said insulator, means connecting the outer of said shields to ground and the inner of said shields to said guard circuit, an insulating hood portion disposed within said inner metallic shield to insulate it from said insulator, said insulating hood portion including a pair of separate portions of insulating material separated from each other between the terminal and grounded portion of said insulator by a ring of conducting material, and means electrically connecting said ring of conducting material to said inner metallic shield.

3. In testing apparatus for an insulator having a high tension terminal and a permanently grounded portion, a test circuit including means for impressing an alternating current test potential between the terminal and grounded portion of said insulator to measure the insulating properties thereof, a guard circuit connected to an ungrounded portion of said test circuit and disposed about at least a portion thereof to shield it, a metallic shield for substantially enclosing said insulator, insulating means disposed on the inside of said metallic shield to insulate it from the insulator, said insulating means comprising a plurality of sections separated from one another at a location falling between the high tension terminal and the grounded portion of the insulator when said shield is in position thereon so that leakage current from said terminal is intercepted by said shield, and means electrically connecting said shield to said guard circuit.

4. In testing apparatus for an insulator having a high tension terminal and a permanently grounded portion, a test circuit including means for impressing an alternating current test potential between the terminal and the grounded portion of the insulator to measure the insulating properties thereof, a guard circuit connected to an ungrounded portion of said test circuit and disposed about at least a portion thereof to shield it, a hood member comprising a pair of electrically conducting shields disposed within one another in insulated relationship for substantially enclosing said insulator, means electrically connecting the outer of said shields to ground, means electrically connecting the inner of said shields to said guard circuit, and means disposed within the inner of said shields to insulate it from the insulator, said last named means comprising a plurality of sections separated from each other at a location designed to fall between the terminal and the grounded portion of said insulator so that leakage current tending to flow between the sections is intercepted by said inner metallic shield.

JAMES H. FRAKES.
GEORGE C. SALTZMAN.